United States Patent
Jain et al.

(10) Patent No.: US 7,664,726 B2
(45) Date of Patent: Feb. 16, 2010

(54) INFLUENCE BASED REWARDS FOR WORD-OF-MOUTH ADVERTISING ECOSYSTEMS

(75) Inventors: Kamal Jain, Bellevue, WA (US); James Russell, Seattle, WA (US); Arun K. Sacheti, Sammamish, WA (US); Brad Ward, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 297 days.

(21) Appl. No.: 11/768,178

(22) Filed: Jun. 25, 2007

(65) Prior Publication Data

US 2008/0320004 A1 Dec. 25, 2008

(51) Int. Cl.
*G06F 7/00* (2006.01)
*G06F 17/00* (2006.01)
*G06F 17/30* (2006.01)
*G06Q 30/00* (2006.01)
*G07G 1/14* (2006.01)

(52) U.S. Cl. .................... 707/1; 707/104.1; 705/14
(58) Field of Classification Search .............. None
See application file for complete search history.

(56) References Cited

U.S. PATENT DOCUMENTS

| | | | |
|---|---|---|---|
| 6,289,318 B1 | 9/2001 | Barber | |
| 6,405,175 B1 | 6/2002 | Ng | |
| 6,662,164 B1 * | 12/2003 | Koppelman et al. | 705/14 |
| 6,741,969 B1 | 5/2004 | Chen et al. | |
| 7,194,448 B2 | 3/2007 | Luth et al. | |
| 2002/0069116 A1 | 6/2002 | Ohashi et al. | |
| 2003/0236701 A1 | 12/2003 | Rowney et al. | |
| 2004/0039640 A1 * | 2/2004 | Koppelman et al. | 705/14 |
| 2004/0210550 A1 * | 10/2004 | Williams et al. | 707/1 |
| 2005/0038697 A1 * | 2/2005 | Aaron | 705/14 |

(Continued)

FOREIGN PATENT DOCUMENTS

KR  10-2003-008892 A  1/2003

(Continued)

OTHER PUBLICATIONS

Biyalogorsky, et al. "Customer Referral Management: Optimal Reward Programs" (2000) Marketing & Science vol. 20, No. 1, 34 pages.

(Continued)

*Primary Examiner*—Mohammad Ali
*Assistant Examiner*—Patrick A Darno
(74) *Attorney, Agent, or Firm*—Lee & Hayes, PLLC

(57) ABSTRACT

Systems and/or methods are presented that facilitate determining the contextual influence of a user in referrals of products or services, and determining an amount of compensation for successful referrals based on the contextual influence of the user. A central service component can track activity and receive data associated with referrals, including data related to the number and type of referrals, and the number of successful referrals. An evaluation component can analyze referral data associated with the user and can determine a conversion ratio as the number of successful referrals compared to the total number of referrals. The evaluation component can utilize the conversion ratio to facilitate determining an amount of compensation that can be awarded and distributed to the user based on the influence of the user within the context of the product or service referred by the user.

20 Claims, 9 Drawing Sheets

U.S. PATENT DOCUMENTS

| | | | |
|---|---|---|---|
| 2005/0043990 A1* | 2/2005 | Powers | 705/14 |
| 2005/0096982 A1 | 5/2005 | Morton et al. | |
| 2005/0102197 A1 | 5/2005 | Page et al. | |
| 2005/0108094 A1* | 5/2005 | Hugron et al. | 705/14 |
| 2005/0182707 A1 | 8/2005 | Yeager | |
| 2005/0234781 A1 | 10/2005 | Morgenstern et al. | |
| 2006/0229936 A1 | 10/2006 | Cahill | |
| 2007/0265921 A1* | 11/2007 | Rempe et al. | 705/14 |
| 2007/0265950 A1* | 11/2007 | Reuss | 705/36 R |
| 2009/0144133 A1* | 6/2009 | Cha et al. | 705/10 |

FOREIGN PATENT DOCUMENTS

KR  10-2003-0008894 A  1/2003

OTHER PUBLICATIONS

Wei, et al. "A Market-Based Approach to Recommender Systems" (2005) ACM Transactions on Information Systems vol. 23, No. 3, 40 pages.

Straub, et al. "An Anonymous Bonus Point System for Mobile Commerce Based on Word-of-Mouth Recommendation" (2004) ACM Symposium on Applied Computing, 8 pages.

* cited by examiner

INFLUENCE BASED REWARDS FOR WORD-OF-MOUTH ADVERTISING ECOSYSTEMS

BACKGROUND

Computing and network technologies have transformed many aspects of everyday life. Networking technologies like the Internet provide individuals virtually unlimited access to remote systems, information and associated applications. As computing and network technologies have evolved and have become more robust, secure and reliable, more consumers, wholesalers, retailers, service providers, entrepreneurs, educational institutions and the like are shifting paradigms and are employing the Internet to perform business in addition to traditional means. For example, merchants can use online advertisements to sell or promote their products either through their own web sites, e-mail or other electronic message advertising, and/or advertisements that can appear on web sites, blogs, etc. of third parties.

Conventionally, merchants have also relied on other forms of advertisement, including word-of-mouth advertising, to promote their products. For example, a purchaser of a product may tell family, friends, or others, with whom the purchaser may have influence, about the product, and/or may give them an advertisement or coupon related to the product. Some of those family members, friends, or others may purchase the product based on such a referral by the purchaser.

With the advent of the Internet, word-of-mouth advertising has entered cyberspace. Conventional word-of-mouth advertising systems typically reward a user based on the number of people to whom he/she refers the advertisement who then perform an action defined by the advertiser. For example, a user may e-mail an advertisement or coupon for a game to a friend. If his/her friend performs the desired action (e.g., purchase) then the user can receive some reward from the advertiser (e.g., product discount, loyalty rewards) because the referral was successful.

One problem with such an approach to rewards is that it looks only at the number of successful referrals a user has generated. This approach inherently promotes users to send out a large number of referrals, even referrals to persons that may have little interest in the advertised product, in the hope that a small percentage of these referrals will be successful. Consequently, such an approach can encourage spamming scenarios and can also lead to uncontrolled brand discrediting. For example, if a user sends out a large number of untargeted referral advertisements for a product, the untargeted referrals can in turn lead to negative sentiment toward the product.

It is desirable to encourage word-of-mouth advertising by users to take advantage of the influence a user may have over friends, family, and others who have an interest in the opinions of the user. It is further desirable to discourage untargeted referrals and spamming with regard to the product or service being advertised, as such approaches can be counterproductive to promoting the product or service.

SUMMARY

The following presents a simplified summary in order to provide a basic understanding of some aspects of the disclosed subject matter. This summary is not an extensive overview of the disclosed subject matter and is not intended to identify key/critical elements or to delineate the scope of such subject matter. Its sole purpose is to present some concepts in a simplified form as a prelude to the more detailed description that is presented later.

Systems and/or methods of evaluating the contextual influence of a user with regard to referrals and rewarding a user for successful referrals made with regard to products or services are presented. In accordance with one aspect of the disclosed subject matter, a central service component (also referred to herein as "CSC") can track referrals, such as word-of-mouth referrals made online (e.g., web site, e-mail, etc.), made by users. The CSC can include an evaluation component that can determine a conversion ratio based on the number of successful referrals as compared to the total referrals made by the user. The evaluation component can also determine an incentive that can be provided to the user based on the number of successful referrals, the conversion ratio, and/or other incentive criteria.

In accordance with an aspect of the disclosed subject matter, one or more users can be registered with a community network associated with the CSC. While a user is logged into the network, the user can make referrals relating to a product or service. The CSC can monitor referrals that can be made by the user, where such referrals can include advertisements that can be displayed on or contained in a web site, a web page, a blog, an e-mail, an instant message, and/or any other form of online electronic communication, for example. The CSC can receive data associated with the referrals, including, for example, the total number of referrals, the number of successful referrals, the date a particular referral was made, the date the particular referral was successful (e.g., referral resulted in a purchase or other desired activity being performed), the type of referral (e.g., posted on a web site, posted in a blog, included in an e-mail, etc.), as well as other data.

The evaluation component can then analyze and evaluate such data to facilitate determining an incentive to be provided to a particular user. In accordance with one aspect, the evaluation component can determine an amount of incentive based on a conversion ratio that can be based on a comparison of the number of successful referrals as compared to the total number of referrals, for example. The amount of incentive also can be based on various other factors, such as the type of referral (e.g., via e-mail, web site, blog, etc.), the type of desired action (e.g., purchase, free trial of product/service, etc.) yielding the successful referral, for example.

In accordance with an aspect of the disclosed subject matter, the account of a user can be reviewed and evaluated on a periodic basis, where the received referral data can be evaluated for each time period, or based on current and historical referral data, to determine an amount of incentive that can be awarded to a particular user. In accordance with another aspect, the account of the user can be evaluated and an incentive determined on a rolling basis, where the incentive can be determined after each successful referral, where the evaluation component can look at current and historical data associated with the user and/or referrals to facilitate determining the amount and/or type of incentive that can be awarded for the successful referral.

In accordance with an aspect of the disclosed subject matter, a certain amount of incentive can be awarded for each successful referral, plus an additional amount of incentive can be awarded where the additional incentive can be determined as a function of the conversion ratio, for example. Thus, the amount of the additional incentive awarded can decrease based on an increase in unsuccessful referrals and/or a decrease in the ratio of successful referrals as compared to the total number of referrals, for example.

To the accomplishment of the foregoing and related ends, certain illustrative aspects are described herein in connection with the following description and the annexed drawings. These aspects are indicative of various ways in which the disclosed subject matter may be practiced, all of which are intended to be within the scope of the disclosed subject matter. Other advantages and novel features may become apparent from the following detailed description when considered in conjunction with the drawings.

DETAILED DESCRIPTION

Figure 1:
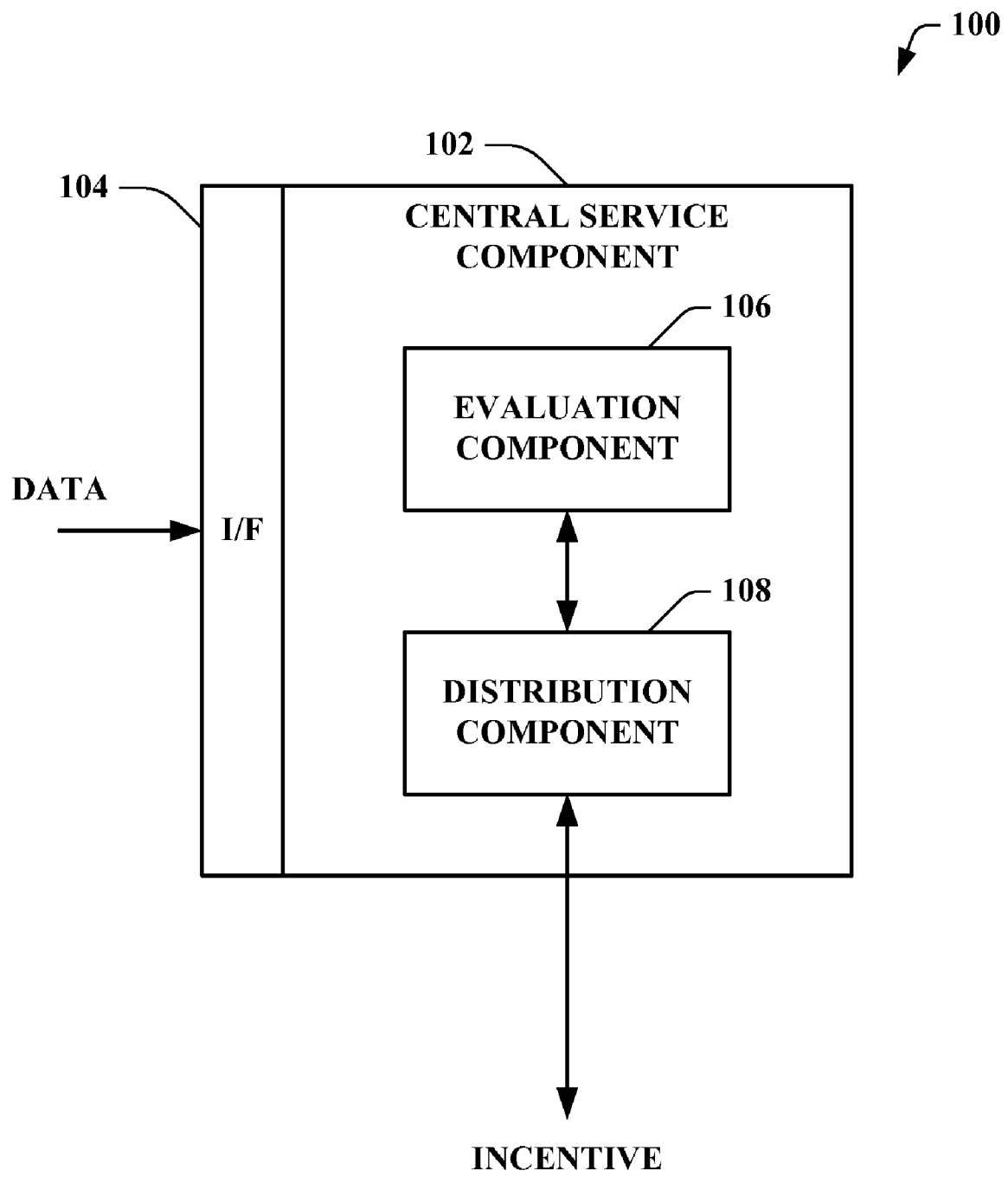
FIG. 1 illustrates a block diagram of a system that facilitates a determination of an incentive related to the contextual influence of a user in accordance with an aspect of the disclosed subject matter.

The various aspects of the disclosed subject matter are now described with reference to the annexed drawings, wherein like numerals refer to like or corresponding elements throughout. It should be understood, however, that the drawings and detailed description relating thereto are not intended to limit the disclosed subject matter to the particular form disclosed. Rather, the intention is to cover all modifications, equivalents, and alternatives falling within the spirit and scope of the disclosed subject matter.

As used in this application, the terms "component," "system," "store," "interface," and the like are intended to refer to a computer-related entity, either hardware, a combination of hardware and software, software, software in execution, and/or firmware. For example, a component may be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over the other aspects or designs.

Furthermore, all or portions of the subject innovation may be implemented as a method, apparatus, or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device, carrier, or media. For example, computer readable media can include but is not limited to magnetic storage devices (e.g., hard disk, floppy disk, magnetic strips . . . ), optical disks (e.g., compact disk (CD), digital versatile disk (DVD . . . )), smart cards, and flash memory devices (e.g. card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

As computer and network technology has developed, merchants, service providers, advertisers, and others have embraced online advertising as a vehicle to promote and sell products and services. Traditional means of advertising, such as word-of-mouth advertising, have also been combined with computer and network technology to employ word-of-mouth advertising as another form of online advertising in cyberspace. However, conventional word-of-mouth advertising systems, such as those that provide rewards to a user based simply on the number of successful referrals, encourage spamming and untargeted referrals to likely disinterested people. As such, such systems can be counterproductive as any benefit that may be gained from successful referrals may be negated by ill will towards the product/service being advertised due to excessive and unfocused advertising.

Systems and/or methods are presented that facilitate evaluating the contextual influence of a user with regard to referrals relating to products and/or services made by the user. The referrals (e.g., word-of-mouth referrals or advertisements) can include advertisements that can be included on a web site, a web page, a blog, an e-mail, an instant message, etc. The disclosed subject matter can include a central service component that can monitor referrals that can be made by users in a community network. The central service component can receive data associated with the referrals, such as the total number of referrals, the number of successful referrals, the type of referral, the time a particular referral was made, the time the particular referral was successful, etc. An evaluation component can analyze and evaluate such data to facilitate determining an amount and/or type of incentive to be provided to a particular user. The evaluation component can calculate a conversion ratio, which can be determined as a function of the number of successful referrals as compared to the total number of referrals of a product or service, for example, and can calculate the amount of incentive that can be awarded to a particular user based in part on the conversion ratio. The conversion ratio can provide an indication of the influence of the user with regard to the product(s) or service(s) referred. The incentive earned by the user can be deposited in an account of the user.

Turning now to FIG. 1, an illustration of a system 100 that facilitates determining an incentive based in part on the contextual influence of a user is depicted. System 100 can facilitate determining the influence a user may have over other users within the context of products and/or services referred by the user to other users, where such referrals can be described as, for example, "word-of-mouth" (WOM) advertisements for a product(s) or service(s). Such WOM advertising can take place in a WOM advertising ecosystem(s) that can be associated with a community network, for example.

In accordance with one aspect of the disclosed subject matter, system 100 can include a central service component 102 (hereinafter also referred to as "CSC 102") that can receive data via an interface component 104 (e.g., discussed infra) to facilitate evaluating the contextual influence of one or more users with regard to referrals (e.g., online referrals that can include product and/or service advertisements, etc.) made by a user(s) to another user(s) regarding a product(s), a service(s), and/or other commerce in order to have the other user(s) take an action desired by the advertiser (e.g., merchant, service provider, advertiser, agent, etc.) marketing the product or service. A user to whom a referral is made is also referred to herein as "recipient."

CSC 102 can receive data, via interface component 104, including data associated with referrals, successful referrals, the type of advertisement, the product and/or service marketed by the advertisement, where the referral originated, where the referral was sent and/or directed, the time a referral is posted, embedded, viewed, clicked on, and/or sent (e.g., the time a referral is made); the time a desired action (e.g., purchase or other activity desired by the advertiser) is performed, which can result in a successful referral; meta data (e.g., comments regarding a product or service), etc.

Referrals can be and/or can include therein an advertisement(s) that can market a product(s) and/or a service(s), and can request, suggest, and/or desire that a desired action be performed by a person (e.g., user) with regard to the referral. The referral and/or advertisement can include, for example, promotional content, an offer, and/or a request to contact a friend (e.g., "refer a friend", "e-mail a friend"), related to a product, a service, and/or other commerce; and/or can be and/or include therein any content that requests, suggests, and/or desires that another person or entity take desired action with regard to the referral and/or product or service marketed by the referral. A successful referral can include, for example, a referral that resulted in the party to whom the referral was directed and/or sent performing one of the set of desired actions, as can be desired by the advertiser.

Promotional content can include, for example, product screenshots, box shots, videos, descriptive information, and/or hyperlinks to another online location (e.g., web site, web page) where the aforementioned promotional content can be perceived. Further, promotional content can be a viral agent, such as a promotional trailer for a product and/or service.

A desired action can include, for example, with regard to the product or service marketed by the advertisement, making a purchase of the product or service, sampling the product or service (e.g., test drive a car, free trial of a product or service), downloading software associated with the product or service, registering for the product or service (whether free or as a purchase), filling out a form or survey associated with the product or service, making an appointment associated with the product or service, providing a review or comments regarding the product or service, syndicating the advertising package marketing the product or service that was referred to the recipient, etc.

It is to be appreciated that a portion of a desired action can occur or be performed while the recipient is not online (so long as the referral does not specify otherwise). For example, the recipient can receive a referral regarding a product from a user. The recipient can view and/or take other action (e.g., mouse click on advertisement, print out token associated therewith) with regard to the referral or advertisement that can be contained therein. The recipient can perform the desired action related to the referral by going to the offline site of the advertiser (e.g., merchant) and/or an affiliate of the advertiser. So long as the merchant, affiliate, and/or the recipient takes action to provide information to the CSC 102 that can verify that the desired action occurred in response to the referral, such desired action can result in a successful referral for the user. For example, the merchant and/or recipient can log in to the community network and provide information demonstrating that a desired action was performed with regard to the referral, and CSC 102 can receive such information.

A referral can be included in an e-mail, an instant message, short message service (SMS), enhanced messaging service (EMS), multimedia messaging service (MMS), a web site, a web page, a blog, an online subscription service, a webfeed, and/or other electronic communication made from the user to another user (e.g., another user or entity).

A referral with regard to a product or service can be considered to be made by the user when and where the user has sent an e-mail, instant message, SMS, MMS, etc. that includes an advertisement associated with the product or service. When the user has the advertisement on his/her web site, blog, webfeed, etc., a referral can be considered to be made, for example, when and if another user views the advertisement, clicks on the advertisement or object embedded therein, pledges an interest in the advertisement, and/or prints out a token associated with the advertisement, or takes any other action with regard to the advertisement, as desired or determined by the advertiser, and/or as implemented by CSC 102, or a component(s) associated therewith, for example.

CSC 102 can include a referral evaluation component 106 that can receive data associated with referrals, can analyze and evaluate such data, and can make a determination regarding an amount of incentive that can be awarded to a particular user with regard to a product(s) and/or service(s). The evaluation component 106 can calculate the incentive amount based on incentive criteria, or a subset thereof, such as, with regard to a particular product or service, a conversion ratio, a total number of referrals, the number of successful referrals, the type of referral (e.g., referral in a blog, referral in an e-mail, etc.), a type(s) of desired action (e.g., purchase, free trial of product/service) to be performed for a successful referral, etc. The incentive that can be awarded can be in virtually any form, such as, for example, monetary, points, coupons, awards, products, services, and/or other compensation or remuneration.

More particularly, the evaluation component 106 can calculate an incentive that can be awarded to a particular user, where the incentive can be based on a conversion ratio associated with or based on the number of successful referrals as compared to the total number of referrals made by a particular user with respect to a particular product(s) or service(s). Evaluation component 106 can also evaluate the referral data in light of the aforementioned various other factors that can be utilized in determining the amount and/or type of incentive that can be awarded to the user. The weight given to any particular factor can be as desired, for example, by the advertiser.

In accordance with one embodiment of the disclosed subject matter, the evaluation component 106 can analyze the referral data associated with or made by a particular user for a predetermined period of time (e.g., one week, one month, etc.), as desired, for example. The account of each user can be evaluated at the end of each month, for example.

In accordance with another embodiment of the disclosed subject matter, the evaluation component 106 can analyze current and historical data associated with the user, referrals and/or one or more products and/or services. For example, when a successful referral with regard to a product is registered with CSC 102, the evaluation component can analyze the data associated with the current successful referral as well as historical data associated with the user and/or referrals to determine the amount and/or type of incentive that can be awarded to the user. The historical referral data can be associated with the same product as that of the current successful referral and/or associated with a different product or service.

It is to be appreciated that the data can relate to the product or service associated with the successful referral(s), and/or can be data that relates to other product(s) and/or service(s). Such data can be utilized in determining a conversion ratio and/or to facilitate determination of the incentive.

Also, it is to be appreciated that a referral made can be given a certain predetermined period of time, as desired, in which to either become a successful referral or an unsuccessful referral. After such time, if data has not been received by CSC 102 indicating that the referral was successful, such referral can be deemed as unsuccessful and/or expired. The evaluation component 106, when evaluating referral data to determine an incentive amount and/or type, may not include referrals that have not expired. For example, such referrals can be included in an evaluation by the evaluation component 106 when the referral has either become successful or expired.

In accordance with one aspect of the disclosed subject matter, the advertiser can award a user a certain amount of incentive for each successful referral with regard to a product or service of the advertiser. In accordance with another aspect of the disclosed subject matter, the advertiser can also provide an additional bonus incentive that can be determined as a function of a conversion ratio related to the number of successful referrals as compared to the total number of referrals. For example, the amount of bonus incentive awarded for each successful referral can decrease as the number of total referrals increases, and/or based on an increase in the number of unsuccessful referrals, and/or based on a decrease in the ratio of successful referrals as compared to the total number of referrals.

The bonus incentive can thereby reward a user based on the influence of the user with other users (e.g., referral recipients) within the context of the product or service referred. The higher the conversion ratio of the user, the higher the bonus incentive that can be awarded to the user for each successful referral. Further, the bonus incentive mechanism can be employed to discourage untargeted referrals and/or spamming, for example, as untargeted referrals and spam referrals can typically yield low conversion ratios, which can result in the user making such referrals receiving a lower amount of bonus incentive for each successful referral.

In accordance with one embodiment of the disclosed subject matter, the evaluation component 106 can determine an incentive amount that can award a predetermined incentive amount for each successful referral, and an additional amount of incentive that can be based on the total number of referrals, a total amount of unsuccessful referrals, and/or a ratio of successful referrals as compared to the total number of referrals, of a user with regard to a product or service. In accordance with an aspect of the disclosed subject matter, the evaluation component 106 can determine the total amount of incentive using an equation with one type of conversion ratio as follows: $I=(a \times SR)+(b \times 1/UR)$, for example, where I can be the total incentive awarded to the user, a can be the base incentive amount per successful referral, SR can be the number of successful referrals during a particular period of time being evaluated, b can be a secondary incentive amount, and UR can be the number of unsuccessful referrals occurring during the particular period of time.

In accordance with another aspect of the disclosed subject matter, the above equation can be modified if there is more than one desired action that can be taken with regard to a product or service advertised in a referral. For example, a first desired action, such as a purchase of the product by the recipient, can result in a first type of successful referral that provide a user with a base incentive, c, per first-type successful referral. A second desired action, such as where the recipient registers for a free trial of the referred product, can result in a second type of successful referral that can provide the user with a secondary incentive, d, per second-type successful referral. Further, there can be a tertiary incentive amount, e, as part of a bonus incentive that can be awarded to the user, which can diminish as the number of unsuccessful referrals increases. Thus, the modified equation can be: $I=(c \times SR1)+(d \times SR2)+(e \times 1/UR)$, where SR1 can be the number of successful referrals of the first type, and SR2 can be the number of successful referrals of the second type. It is to be appreciated that there can be any number of desired actions that can be associated with a product or service and/or a referral/advertisement associated therewith, and the two types of desired actions in the above example if for purposes of example only.

In accordance with yet another aspect of the disclosed subject matter, the evaluation component 106 can determine an amount of incentive with regard to a product or service using the equation: $I=(a \times SR)+(b \times CR1)$, where I can be the incentive that can be awarded to the user, a can be a base incentive per successful referral, SR can be the number of successful referrals during a particular evaluation period (e.g., rolling basis, an hour, a day, a week, a month, etc.), b can be the secondary incentive amount (e.g., bonus incentive) per successful referral, and CR1 can be a conversion ratio equal to the number of successful referrals divided by the total number of referrals, for example, during a particular evaluation period, or based on current and/or historical data regarding referrals made by the user.

Further, as desired by the advertiser, the determination of the amount of incentive can be weighted based on some or all of the aforementioned factors. For example, an advertiser may desire to apply a different weight factor to a referral made in a blog or a web site than the weight factor applied to a referral made via an e-mail or instant message, since a blog or web site generally can have many viewers that come to the blog or site, as compared to an e-mail or instant message, which can involve a user taking an affirmative action to send the referrals and such referrals generally are sent to a finite number of people. The weight factors can be employed by the evaluation component 106 when determining an amount of incentive to be awarded a user with regard to a product or service. For example, the weight factors can be employed to modify the conversion ratio, or calculation thereof, and/or any equation, function, or algorithm employed to facilitate determining the amount of incentive.

Further, the referral data, and other data, can be evaluated by evaluation component 106 to determine the type of incentive that can be awarded to a respective user. In accordance with one aspect of the disclosed subject matter, the same type of incentive can be awarded to a user regardless of the type of desired action performed by the recipient with regard to the referral made by the user.

In accordance with another aspect of the disclosed subject matter, a different type of incentive can be awarded to a user based on the desired action performed by the recipient with regard to the referral made by the user. For example, evaluation component 106 can determine that a purchase of a product made by a recipient with regard to a referral of the product by the user can result in an incentive that can include money being awarded to the user. Further, evaluation component 106 can determine that registration for a free trial sample of a product made by a recipient with regard to a referral of the product by the user can result in an incentive that can include reward points being awarded to the user.

In accordance with yet another aspect of the disclosed subject matter, the evaluation component 106 can determine the type of incentive that can be awarded a user based on whether the incentive is the primary incentive, such as can be awarded for each successful referral, or a secondary incentive, such as a bonus incentive that can be based on a conversion ratio associated with the user, product(s) and/or service (s), for example.

CSC 102 can further include a distribution component 108 that can facilitate distributing the incentive to the user. The distribution component 108 can distribute the appropriate incentive once the evaluation component 106 has determined the amount (e.g., 1 point, 5 points, etc.) and/or type (e.g., money, points, etc.) of incentive to be awarded to the user. The incentive can be provided to the user by depositing such incentive into the account of the user. Once the incentive is deposited to the account of the user, it can be provided to the user in virtually any suitable manner, such as allowing the user to retrieve the incentive from the account of the user, directing a merchant to provide the incentive to the user, facilitating the mailing of such incentive to the user, etc.

To further discourage poorly targeted referrals or spamming, CSC 102 can facilitate limiting the number of referral opportunities available to a user. CSC 102 can then facilitate providing an additional number of referral opportunities to the user for each successful referral of the user. For example, with respect to a product referral, CSC 102 may only allow a user ten referral opportunities initially. If the user achieves a successful referral, the CSC 102 can facilitate providing the user another ten referral opportunities, or some other number of additional referral opportunities, as desired, for example, by the advertiser.

As an example to illustrate one or more aspects in accordance with the disclosed subject matter, a user can be logged into, authenticated by, and/or identified by the community network. The user can refer an advertisement for a product (e.g., video game) to another user, who, for example, can be a friend that the first user believes would be interested in the product. The referral can be in the form of an advertisement on a web site, blog, e-mail, or any other form of electronic communication, as described herein, for example, with regard to system 100. The referral can be monitored by CSC 102, which can facilitate registering the referral and storing information associated therewith (e.g., product advertised, time of referral, type of referral) in the account of the user making the referral. The recipient views the advertisement in the referral and purchases the product marketed in the advertisement. The CSC 102 can receive the information associated with the purchase and can register the purchase as a successful referral for the user, and such information can be stored in his/her user account. Also, CSC 102 can register the purchase in the account of the recipient, who can also have a user account. The successful referral can thereby improve the influence of the user within the context of the referred product, as the ratio of successful ratios to total referrals can thereby be increased.

Turning back to interface 104, the system 100 can include any suitable and/or necessary interface component 104 (also herein referred to as "interface 104"), which can provide various adapters, connectors, channels, communication paths, etc. to integrate the ad component 102 into virtually any operating and/or database system(s) and/or with one another system(s). In addition, the interface component 104 can provide various adapters, connectors, channels, communication paths, etc., that can provide for interaction with the CSC 102, evaluation component 106, the distribution component 108, and/or any other component, data and the like associated with the system 100.

The disclosed subject matter can provide benefits to users (e.g., publishers that publish or make referrals), consumers, and advertisers (e.g., merchants, service providers). The benefits to the users can include payment or other rewards from advertisers; the advertisement associated with the referral provided to the user may be appealing, which can make the referral of the user and/or location of the referral (e.g., user's web site or blog) more appealing; the amount of time a customer or other person may spend on the web site, blog, etc. of the user may be increased; potential for increased recognition/reputation from the community; and/or potential for improved ranking in query results.

The benefits to the customer can include a cost saving when performing a desired action (e.g., purchase) via the referral; a streamlined and seamless experience, with purchasing capabilities presented at the point of discovery of the advertisement and product/service; strong referral, community and WOM components from trusted networks as well as convenient feedback mechanisms; having access to interesting and free material (e.g., viral agents) as well as access to relevant product information in context; and/or the ability to quickly become a publisher himself/herself, through syndication tools.

The benefits to advertisers can include extending their market reach; enabling self-targeting advertising, with propagation based on the interest of the user or WOM referrals; enabling advertisers to tailor the package behavior to suit their products based on their own market knowledge; a potential increase in advertiser ranking in search and other advertising results; and/or can receive valuable customer and business intelligence.

Figure 2:
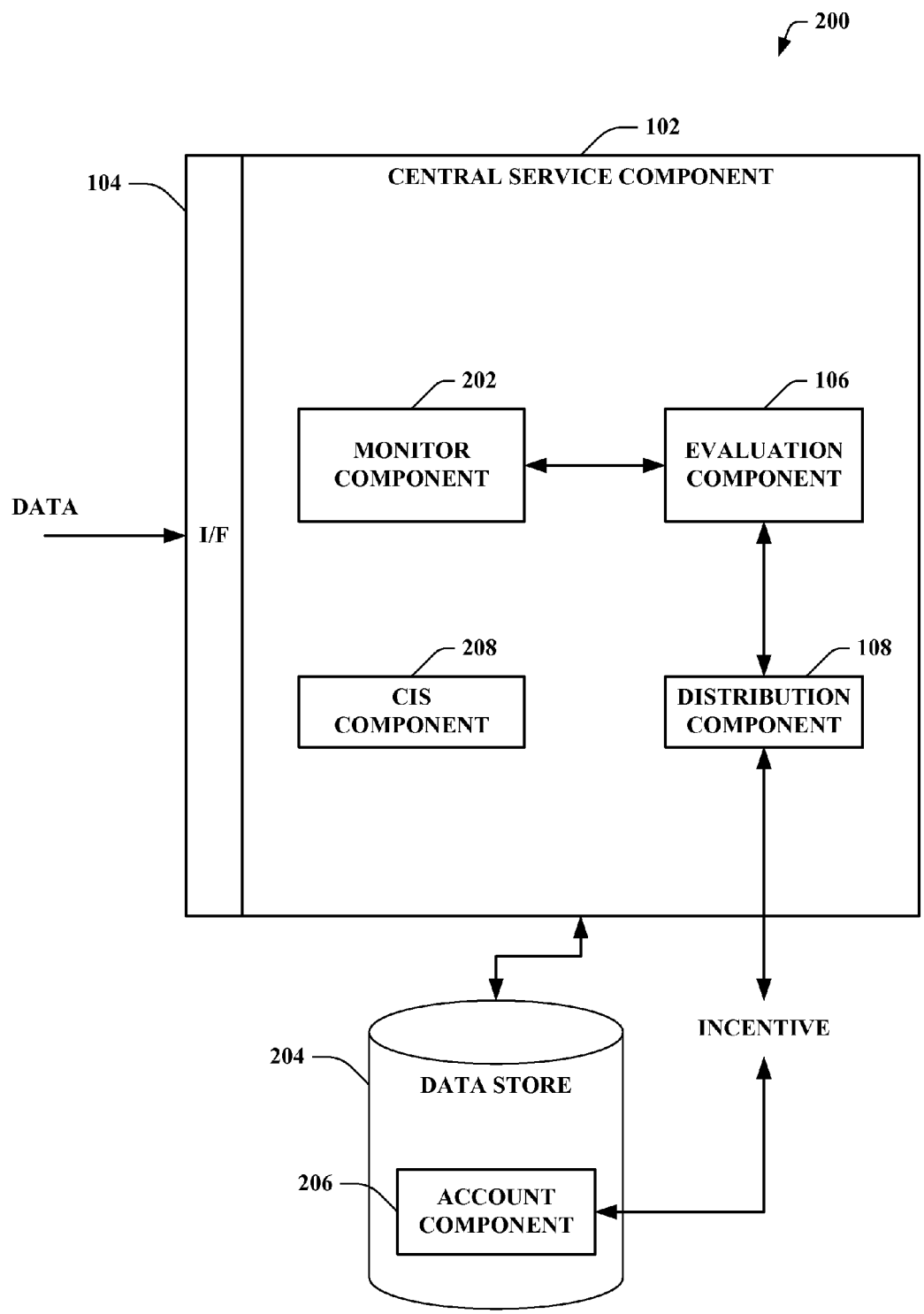
FIG. 2 illustrates a block diagram of another system that facilitates a determination of an incentive related to the contextual influence of a user in accordance with an aspect of the disclosed subject matter.

Referring to FIG. 2, a system 200 that facilitates associating or linking user activity with an online advertisement is illustrated. System 200 can facilitate determining an amount and/or a type of incentive that can be awarded to a user based on the contextual influence of the user with regard to referrals of products and/or services to other users. System 200 can include CSC 102 that can receive data, via interface 104, regarding referrals, users, products, and/or services. The data can include information relating to referrals, users, products, and/or services, as more fully described herein, for example, with regard to system 100.

CSC component 102 can include an evaluation component 106 that can facilitate determining the amount and type of incentive that can be awarded to a user. The evaluation component 106 can function as more fully described herein, for example, with regard to system 100. The evaluation component 106 can include a monitor component 202 that can monitor the online activity of users, particularly with regard to online activity associated with referrals of products and/or services made by one or more users to other users and/or the performance of desired actions (e.g., purchase or other desired action/activity) made in response to referrals.

The monitor component 202 can also facilitate monitoring offline activity of users, including recipients of referrals, such as information associated with referrals and/or a desired action(s) that can be monitored through data received from merchants and/or can be provided by a user (e.g., recipient) at a different time when the user is online, for example. The monitor component 202 can monitor and receive data regarding all such online activity and offline activity associated with users.

The CSC 102 can be associated with a data store 204 that can store any suitable data (e.g., information) associated with referrals, products, services, users, etc., including, for example, information associated with referral(s) made by a user(s) to another user (e.g., recipient) with regard to a product(s) or service(s); information associated with successful referrals of respective users; information associated with the amount and/or types of incentives; information regarding a conversion ratio respectively associated with users, products, and/or services; information regarding the online activity and offline activity of users in the community network; account information of respective users; information associated with merchants disposed in the community network; and/or information associated with advertisements, promotional content, etc. that can be included in referrals, etc. The data store 204 also can facilitate storing information associated with a user in a user account 206 associated with the user, and the user account 204 can be stored in data store 204.

It is to be appreciated that the data store 204 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 204 of the subject systems and methods is intended to comprise, without being limited to, these and any other suitable types of memory. In addition, it is to be appreciated that the data store 204 can be a server, a database, a hard drive, and the like.

CSC 102 can also include a common identity service (CIS) component 208 that can receive authentication information from one or more users to identify a particular user and authenticate (e.g., verify) a particular user, so that the identity of a particular user can be reasonably known by the CSC 102. The CIS component 208 can request a user to authenticate, for example, when the user attempts to manipulate (e.g., mouse click, keystroke, voice command, etc.) an advertisement, an object associated with an advertisement, and/or associated controls that can be associated with an advertisement for a product or service, primary actions, community actions, syndication actions, etc.

The CSC 102 can facilitate storing information in user account 206 that can be associated with a respective user, as the CIS component 208 can identify the respective user, so that the data store 204, the CSC 102, and other components can know which user account 206 is to be accessed when sending data to or receiving data from data store 204, and/or associating data with the user account 206 when data is stored in data store 204.

Figure 3:
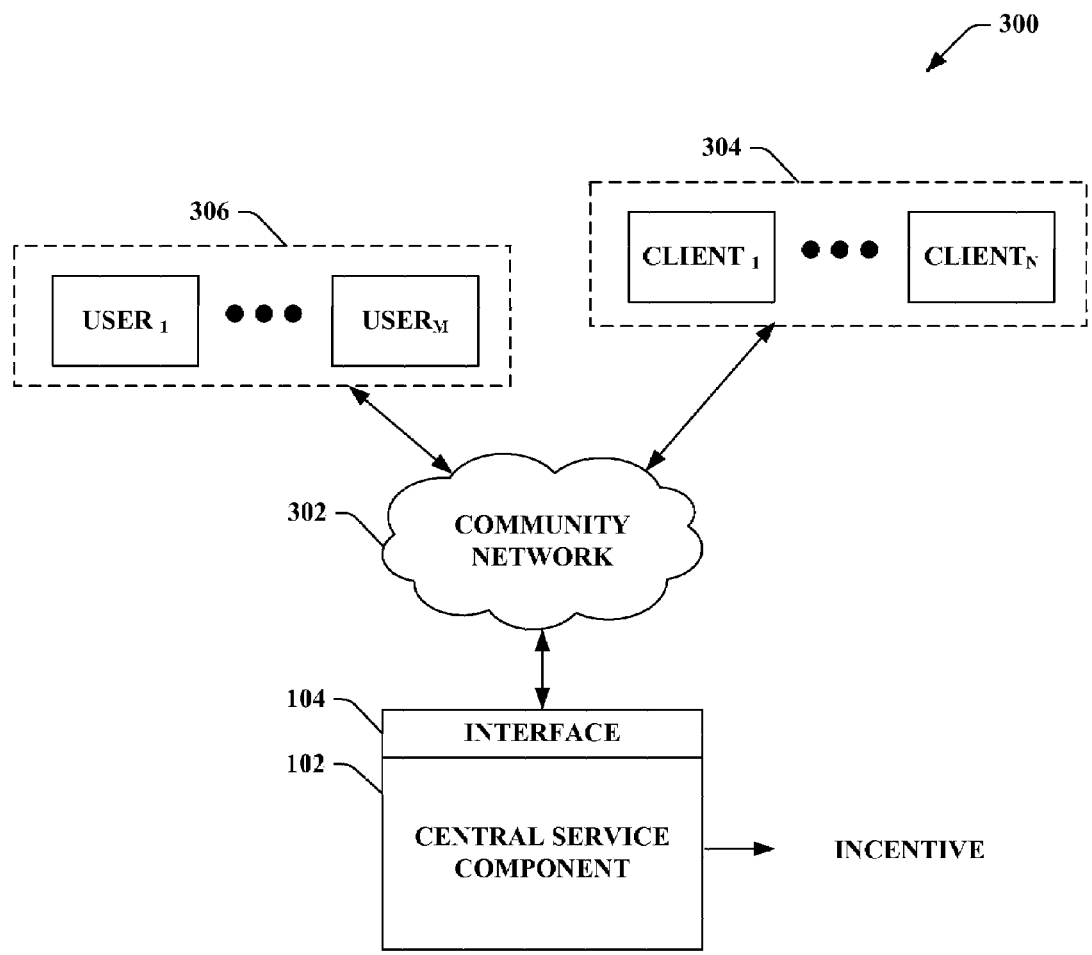
FIG. 3 illustrates a block diagram of a system that facilitates communication with a community network to facilitate a determination of an incentive in accordance with an aspect of the disclosed subject matter.

Turning to FIG. 3, depicted is a system 300 that facilitates communication with a community network to facilitate determining an incentive that can be awarded to a user based on the contextual influence of the user in accordance with the disclosed subject matter. The system 300 can include CSC 102 that can receive data, via interface 104, associated with referrals, users, products, and/or services, etc. The data can include information relating to referrals, users, products, and/or services, as more fully described herein, for example, with regard to system 100.

CSC 102 can include an evaluation component 106 that can facilitate determining the amount and type of incentive that can be awarded to a user. The CSC 102 and evaluation component 106 can function as more fully described herein, for example, with regard to system 100 and/or system 200. For instance, the CSC 102 can determine the amount and type of incentive, as well as the amount and type of bonus incentive, that can be awarded and distributed to a user for each successful referral, based upon received data, including, but not limited to, data associated with: referrals, online user activity, offline user activity, online advertisements, user accounts, user account activity across a disparate network, activity across a network, products and/or services, etc.

Furthermore, the CSC 102 can interact with a community network 302. Further, the community network 302 can include most any suitable number of clients 304, such as $client_1$ to $client_N$, where N is a positive integer, that can be associated with the community network 302. The client(s) can be merchant(s), advertiser(s), retailer(s), wholesaler(s), etc. that can facilitate generation of online advertisements related to products, services, and/or other commerce. The client(s) can also facilitate providing information regarding incentives, conversion ratios, incentive criteria, etc., as well as facilitate providing the incentives that can be distributed by the CSC 102.

The community network 302 also can include most any suitable number of users 306, such as $user_1$ to $user_M$, where M is a positive integer. A user 306 can be a referring party that can make referrals and/or a recipient of a referral. It is to be appreciated that the CSC 102 can differentiate between respective users 306 and clients 304 in the community network 302.

In one example, the community network 302 can be a network associated with commerce and/or transactions related to commerce such as buying an item, a product, and/or service; selling an item, a product, and/or service; buying a portion of an item, a product, and/or a service; selling a portion of an item, a product, and/or a service, etc. The CSC 102 can receive and evaluate data from the community network 302 in order to facilitate determining the amount and/or type of incentive to award a particular user based on the contextual influence of the user with regard to product(s) and/or service(s). In particular, the CSC 102 can provide incentives to respective users 306 associated with the network 302 based in part on the evaluation of data, such as data associated with referrals, obtained from the community network 302. It is to be appreciated that community network 302 can be comprised of one or more disparate networks that can cooperate with each other.

Figure 4:
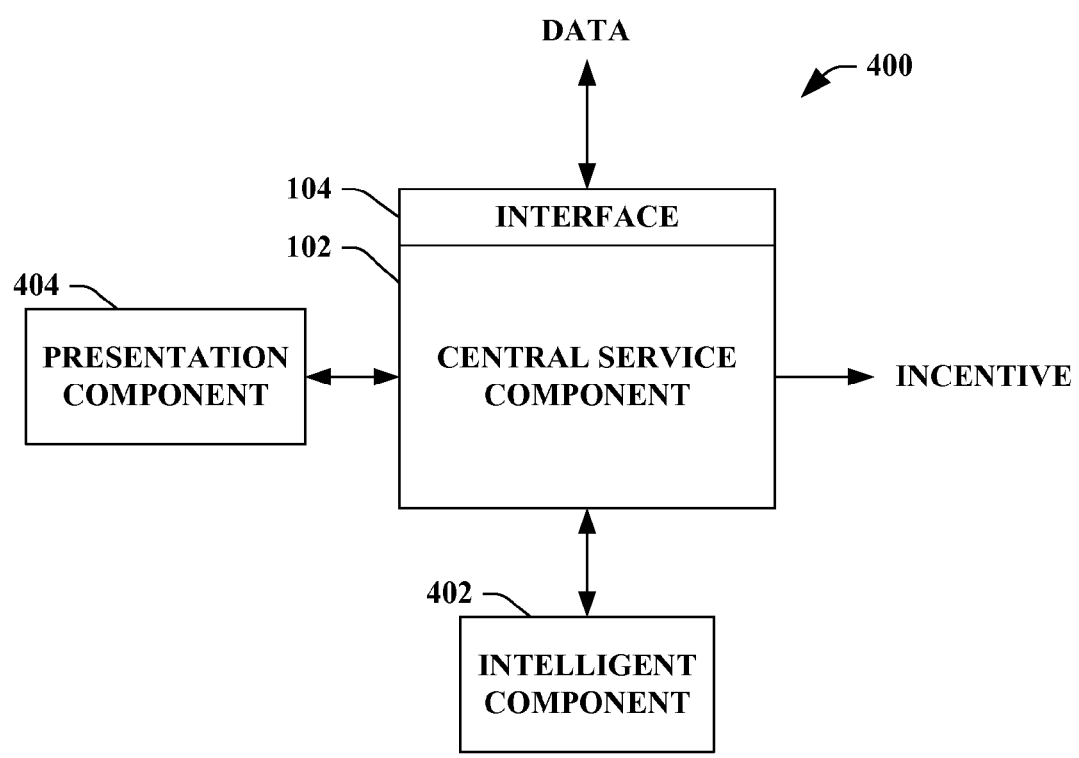
FIG. 4 illustrates a block diagram of a system that employs intelligence to facilitate a determination of an incentive related to the contextual influence of a user in accordance with an aspect of the disclosed subject matter

FIG. 4 illustrates a system 400 that employs intelligence to facilitate determining whether user activity can be associated with an online advertisement in accordance with the disclosed subject matter. The system 400 can include the CSC 102 and the interface 104, wherein it is to be appreciated that the CSC 102 and the interface 104 can be substantially similar to respective components and interfaces described with regard to system 100, system 200, and/or system 300. The system 400 further includes an intelligent component 402. The intelligent component 402 can be utilized by the CSC 102 to facilitate ensuring integrity can be distilled in relation to a determination as to the amount or type of incentive that can be awarded to a user with regard to a successful referral(s) of a product(s) or service(s). For example, the intelligent component 402 can infer a time a referral was made, a time a referral became a successful referral, an amount and/or type of incentive that can be awarded, a determination of a conversion ratio associated with a user(s), product(s), and/or service(s), etc.

It is to be understood that the intelligent component 402 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The CSC 102 can further utilize a presentation component 404 that provides various types of user interfaces to facilitate interaction between a user and any component coupled to the CSC 102. As depicted, the presentation component 404 is a separate entity that can be utilized with the CSC 102. However, it is to be appreciated that the presentation component 404 and/or similar view components can be incorporated into the CSC 102 and/or a stand-alone unit. The presentation component 404 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the CSC 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 5-8 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 5:
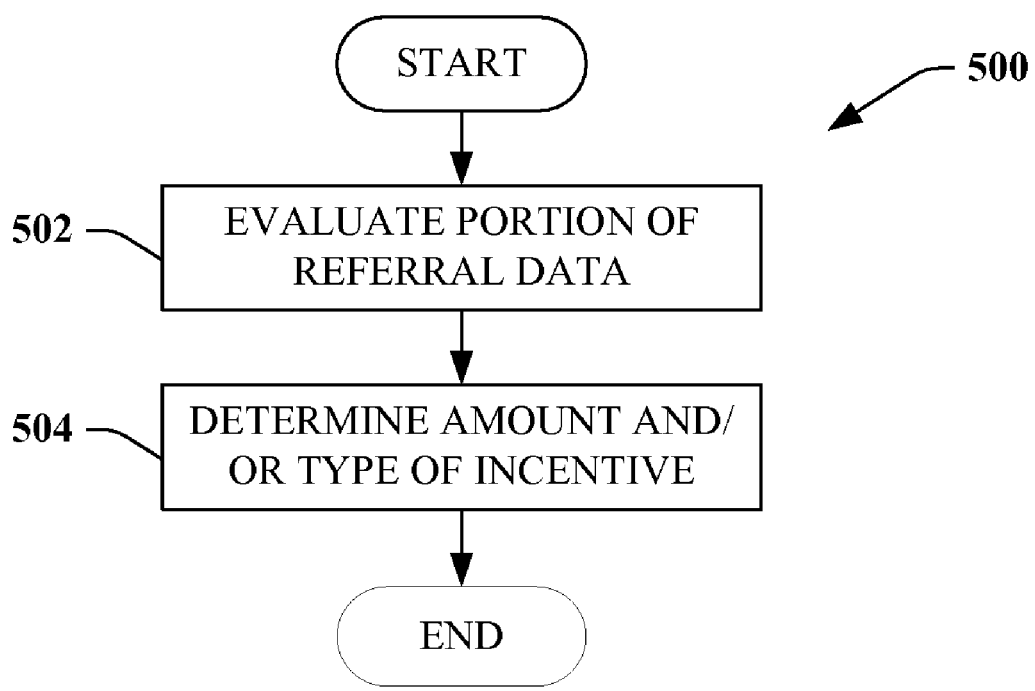
FIG. 5 is a representative flow diagram illustrating a methodology that facilitates determining an incentive in accordance with an aspect of the disclosed subject matter.

Turning now to FIG. 5, depicted is a method that can facilitate determining the contextual influence of a user in accordance with an aspect of the disclosed subject matter. At 502, data, or a portion thereof, related to referrals made by one or more users with regard to one or more products and/or services can be evaluated, for example, by the CSC 102 and/or the evaluation component that can be included therein. For example, data relating to referrals can include data associated with referrals, successful referrals, the type of advertisement, the product and/or service marketed by the advertisement, where the referral originated, where the referral was sent and/or directed, the time a referral is posted, embedded, and/or sent (e.g., the time a referral is made); the time a desired action (e.g., purchase or other activity desired by the advertiser) is performed, which can result in a successful referral; meta data (e.g., comments regarding a product or service), etc. The CSC 102 can receive such data via interface 104 and/or can retrieve such data from the data store 206 and can evaluate such data. Referrals can be as described more fully, for example, with regard to system 100, and can include information (e.g., advertisement) associated with a product(s) and/or service(s), as described more fully, for example, with regard to system 100. Further, referrals can be included in virtually any form of online electronic communication (e.g., e-mail, web site, etc.), as more fully described, with regard to system 100.

The data related to referrals can be evaluated to facilitate determining the influence of a particular user over other users within the context of a product(s) and/or service(s). In accordance with an aspect of the disclosed subject matter, the data evaluation with regard to referrals of a particular user can be performed on a periodic basis (e.g., weekly, monthly, etc.), as desired. In accordance with another aspect of the disclosed subject matter, the evaluation of data associated with referrals of a user can be performed on a rolling basis, such as each time (e.g., at the time of the successful referral, on the same day as one or more successful referrals, etc.) the user has a successful referral.

The data related to referrals received during a given time period can be evaluated to determine the total number of referrals of a particular product or service made by a particular user, the number of successful referrals made by the particular user with regard to the product or service, for example. Further, if there is more than one action (e.g., purchase, free trial of product/service) that can be performed by the recipient with regard to the advertisement for a product and/or service either of which can result in a type of successful referral, such different types of successful referrals can be evaluated and distinguished accordingly.

At 504, determinations can be made regarding an amount and/or type of incentive that can be awarded respectively to one or more users with regard to (e.g., within the context of) each of one or more products or services. Determination of an incentive amount and/or type can be based on the number of successful referrals as compared to the total number of referrals with regard to such product or service, which can be a conversion factor, for example. The amount and/or type of incentive can also be based on various other factors (e.g., incentive criteria), such as the number of successful referrals, the total number of referrals, the type of desired action performed, the type of referral (e.g., referral in a blog, referral in an e-mail, etc.), etc.

Determination of the incentive with regard to a user, and a product or service can be performed, for example, for a predetermined time period. Such determination can be performed by the evaluation component 106, for example.

The incentive can be in virtually any form, such as, for example, monetary, points, coupons, awards, products, services, and/or other compensation or remuneration. The incentive can be awarded to the user and deposited in the account of the user, for example.

In accordance with one aspect of the disclosed subject matter, the advertiser can pay a user a certain amount of incentive for each successful referral. The advertiser can also provide an additional bonus that can diminish as the number of total referrals increases. In accordance with one embodiment of the disclosed subject matter, an incentive can be determined by the evaluation component 106 using an equation that can include one type of conversion ratio, where such equation can be: $I=(a\times SR)+(b\times 1/UR)$, for example, where I can be the total incentive awarded to the user, a can be the base incentive amount per successful referral, SR can be the number of successful referrals during the period of time being evaluated, b can be a secondary incentive amount, and UR can be the number of unsuccessful referrals during the time period being evaluated.

It is to be appreciated that, in accordance with an aspect of the disclosed subject matter, the aforementioned equation can be modified, as desired, so that the incentive determination can account for other factors, such as instances where there can be more than one type of desired action, each of which when performed by one or more recipients, can be a type of successful referral.

For example, an advertiser may have an advertisement for a product that contemplates prospective customer purchasing the product and/or taking a free trial sample of the product. When a user makes a referral that includes such advertisement to a recipient, and such referral is successful, the evaluation component 106 can facilitate determining and awarding/distributing a different amount and/or type of incentive based on the type of successful referral. For example, if the recipient purchases the referred product, the user making the referral may receive one type and/or amount of incentive; if the recipient takes a free trial sample of the product, the user making the referral can still be credited for a successful referral and can receive an incentive, because taking a free trial was another desired action associated with the referral/advertisement. However, the incentive that can be awarded to the user based on the free-trial-related successful referral can be a different type and/or amount of incentive, as compared to the incentive that is awarded for a purchase-related successful referral.

In accordance with another embodiment of the disclosed subject matter, an incentive can be calculated by the evaluation component 106 using an equation that can incorporate a different type of conversion ratio, where the incentive can be calculated as follows: $I=(a\times SR)+(b\times CR1)$, where I can be the incentive to be awarded to the user, a can be a base incentive per successful referral, SR can be the number of successful referrals during the particular evaluation period, b can be the secondary incentive amount per successful referral, and CR1 can be a type of conversion ratio, which can be the number of successful referrals divided by the total number of referrals, for example, during the particular evaluation period, or based on current and/or historical data regarding referrals made by the user.

Further, as desired by the advertiser, the evaluation component 106 can facilitate determining an incentive by employing a conversion ratio weighted based on a certain factor(s), or an equation or algorithm that can place a weight on a certain factor(s), that can be used to determine an incentive, as desired. For example, an advertiser may desire to apply a different weight factor to a referral made in a blog or a web site than the weight factor applied to a referral made via an e-mail or instant message, since a blog or web site generally can have many viewers that come to the blog or site and can be less intrusive as a user/recipient typically reaches such blog or site through his/her action, whereas an e-mail or instant message generally are sent to a finite number of people and a user/recipient can have less control over whether or not the referral is received by the user/recipient. Such weighting can be employed by the evaluation component 106 to facilitate determining an amount and/or type of incentive that can be awarded to a user with regard to a product or service.

Further, the referral data, and other data, can be evaluated by evaluation component 106 to determine the type of incentive. In accordance with one aspect of the disclosed subject matter, the same type of incentive can be awarded to a user regardless of the type of desired action performed by the recipient with regard to the referral made by the user.

In accordance with another aspect of the disclosed subject matter, a different type of incentive can be awarded to a user based on the desired action performed by the recipient with regard to the referral made by the user. For example, evaluation component 106 can award a monetary incentive where the desired action performed by the recipient is a purchase of the referred product by the referral recipient, as compared to an award of reward points where the desired action performed is a registration for a free trial sample of the referred product by the recipient.

In accordance with yet another aspect of the disclosed subject matter, the evaluation component 106 can determine the type of incentive that can be awarded a user based on whether the incentive is the primary incentive, such as can be awarded for each successful referral, or a secondary incentive, such as a bonus incentive that can be based on a conversion ratio associated with the user, product(s) and/or service (s), for example. At this point, methodology 500 can end.

Figure 6:
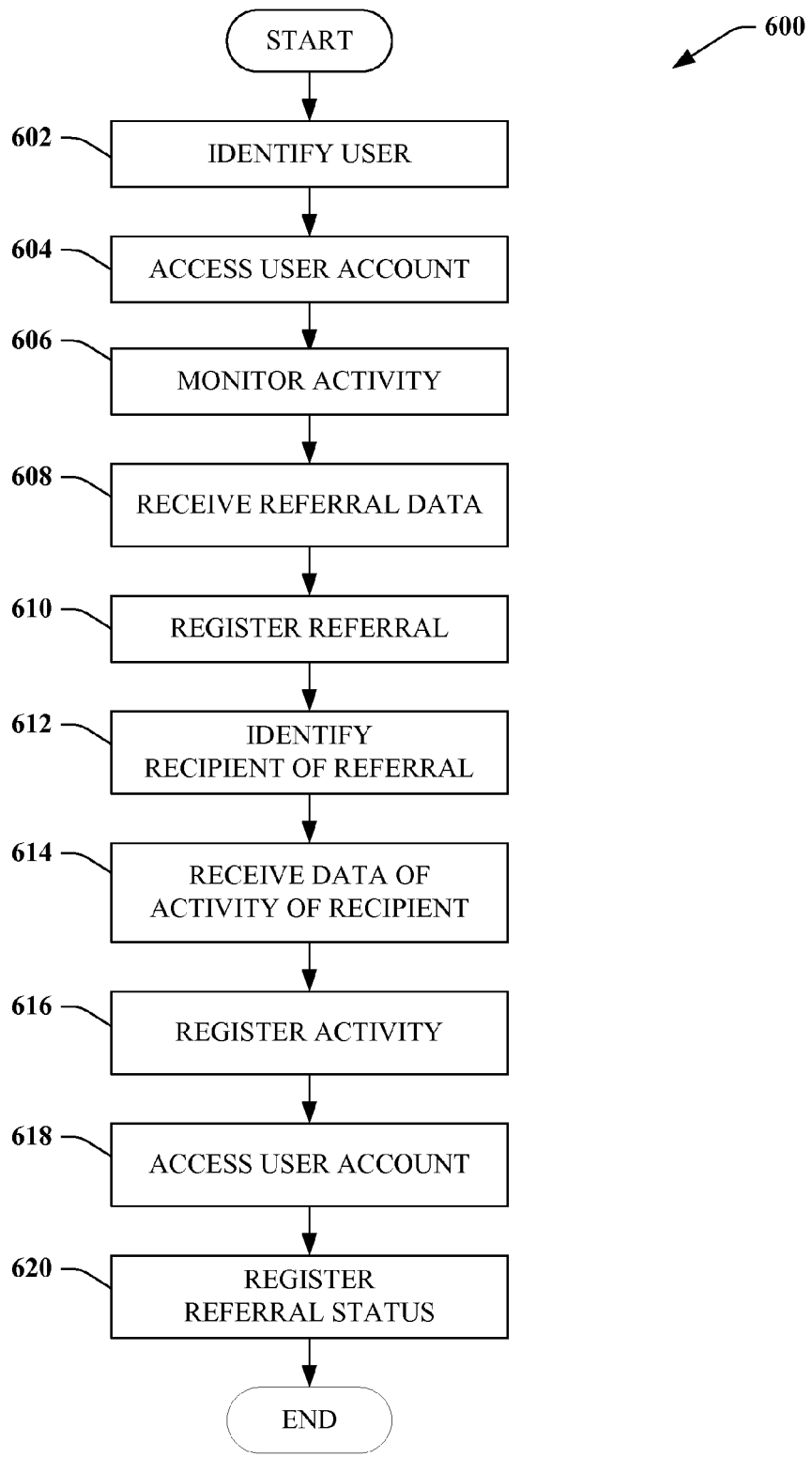
FIG. 6 is a representative flow diagram depicting a methodology that facilitates registering a successful referral in accordance with an embodiment of the disclosed subject matter.

Referring to FIG. 6, a methodology 600 that can facilitate registering a successful referral is illustrated. At 602, a user can be identified. In accordance with an aspect of the disclosed subject matter, the user can be associated and/or registered with a community network. The user can provide authentication information to the community network and/or the CSC 102 that can be associated therewith, so that the user can be identified by the network and/or CSC 102, and the user can access the network.

At 604, the account of the user can be accessed, for example, by the CSC 102 and/or the user. At 606, the activity of a user can be monitored, for example, by CSC 102. For example, CSC 102 can monitor and record information regarding referrals made by the user to recipients, including the time of each referral, the type of each referral, whether a referral is successful, the time of a successful referral, etc., as more fully described herein, for example, with regard to system 100 and methodology 500. It is to be appreciated that CSC 102 can monitor referrals made while the user making the referral(s) is not logged in to the community network and CSC 102, as CSC 102 can monitor the web site, web page, blog, webfeed, etc. of a user to monitor whether referrals are made via such channels as a result of advertisements or other types of referrals that can be made/displayed via such channels. For example, a user can include an advertisement for a product on her website, while logged into the network and information regarding the advertisement can be monitored and recorded by the CSC 102. Subsequently, if the user is not logged into the network, but her website is still accessible, and another user accesses that website and views and/or performs a desired action with regard to the advertisement, the CSC 102 can still monitor and register such referral, even though the referring user is not currently logged into the network.

Further, it is to be appreciated that CSC 102 can monitor offline activity of a user, such as purchases or other desired actions made by a recipient of a referral, where the CSC 102 can receive information from merchants and/or recipients relating to actions/activities performed by the recipient in response to a referral(s) from a user. For example, a referral recipient can receive a referral from a user while online in the network. The recipient can go to a merchant and perform a desired action (e.g., purchase) of a product advertised in the referral. The merchant can provide, and CSC 102 can receive, information regarding the purchase, where, for example, the recipient provides the merchant with the recipient's user account information and/or the recipient can access the network and/or his/her account and can provide, and CSC 102 can receive, information demonstrating that the recipient performed the desired action in response to the referral.

At 608, data associated with one or more referrals can be received, for example, by CSC 102. Such referral data can be stored in the account of the user and/or the data store 204 and/or analyzed by the evaluation component 106, for example. At 610, the one or more referrals can be registered, for example, in the account of the user and/or referral recipient and/or stored in the data store 204. The CSC 102 can facilitate registering of the one or more referrals.

At 612, the recipient of the referral can be identified, for example, by the CSC 102. The recipient can be identified by being authenticated by the community network and/or CSC 102 via CIS component 208, for example. Such identification information can be stored in the account of the user making the referral, and/or the data store 204. At 614, data associated with the activity (e.g., desired action) of the recipient can be received by the CSC 102. At 616, the activity/action of the recipient of the referral can be registered by CSC 102, where such registration can be stored in the account of the user who made the referral, the account of the recipient, and/or the data store 204. For example, if the recipient performs a desired action with regard to the product or service associated with the referral, data associated with such action can be received and registered by the CSC 102. If no action is taken by the recipient with regard to the referral within a predetermined amount of time, the CSC 102 can monitor such lack of activity/action and can deem such referral as unsuccessful and/or expired, where such referral can be registered as an unsuccessful referral by CSC 102, and such referral information can be stored in the account of the user, account of the recipient, and/or the data store 204.

At 618, the account of the user can be accessed, for example, by CSC 102. At 620, the status of a particular referral can be registered in the account of the user by CSC 102, for example. For example, a referral can be registered in the user account as a successful referral if the recipient of the referral has performed a desired action with regard to the referral. If the recipient fails to perform a desired action within a predetermined period of time after the referral was made, the status of the referral can be registered as an unsuccessful referral (e.g., expired referral). Further, other information regarding the referral, such as the time of the successful referral, the type of successful referral, etc., can be included with the information regarding registration of the referral status. At this point, methodology 600 can end.

Figure 7:
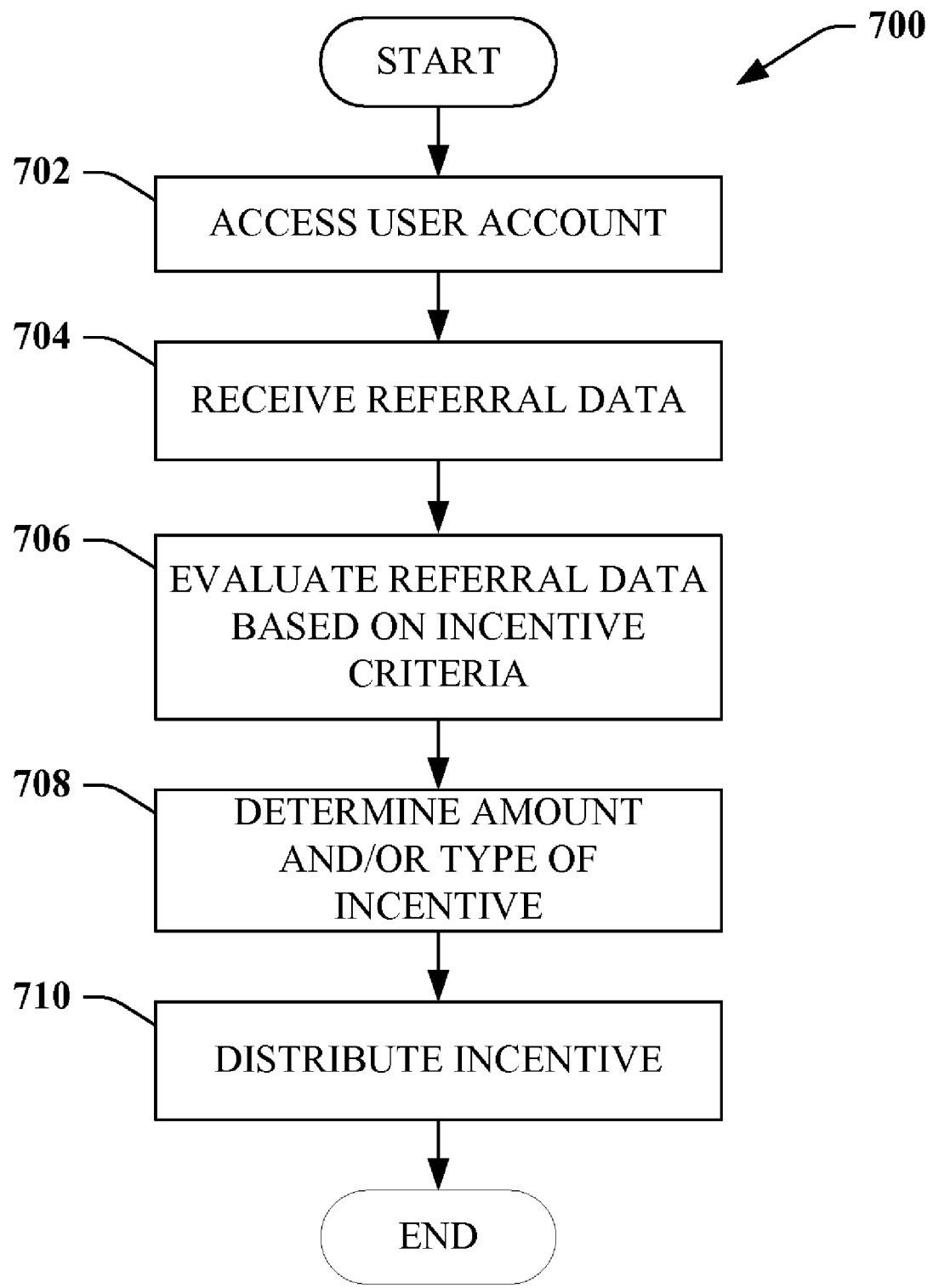
FIG. 7 is a representative flow diagram illustrating an alternative methodology that facilitates determining an incentive in accordance with another embodiment of the disclosed subject matter.

Turning to FIG. 7, a methodology 700 that can facilitate determining an incentive based on the contextual influence of a user is illustrated. At 702, the account of the user can be accessed, for example, by the CSC 102. At 704, data associated with one or more referrals associated with the user can be received, for example, by CSC 102. Such referral data can be retrieved from the account associated with the user that can be stored in the data store 204 and/or received via interface 104, for example.

At 706, data associated with referrals of a user with regard to a product(s) or service(s) can be evaluated based on incentive criteria. For example, the data related to referrals can be evaluated to facilitate determining the influence of a particular user over other users within the context of a product(s) and/or service(s). In accordance with an aspect of the disclosed subject matter, the data evaluation with regard to referrals of a particular user can be performed on a periodic basis (e.g., weekly, monthly, etc.), as desired. In accordance with another aspect of the disclosed subject matter, the evaluation of data associated with referrals of a user can be performed on a rolling basis, such as each time the user has a successful referral. The evaluation component 106 also can receive and analyze current and historical data associated with the user, the account of the user, referrals, the product(s) and/or service (s) referred, etc.

The received data can be evaluated to determine the total number of referrals of a particular product or service made by a particular user, the number of successful referrals made by the particular user with regard to the product(s) and/or service (s), for example. Further, if there is more than one action (e.g., purchase, free trial of product/service) that can be taken by the recipient with regard to the product or service either of which can result in a type of successful referral, such different types of successful referrals can be evaluated and distinguished accordingly.

At 708, an amount and/or type of incentive can be determined with regard to a user, and the referrals of the user relating to a product(s) and/or service(s). CSC 102, and evaluation component 106 included therein, can facilitate determining the amount and/or type of incentive that can be awarded respectively to one or more users for referrals made with regard to (e.g., within the context of) one or more products or services. Determination of an incentive amount can be based on the number of successful referrals as compared to the total number of referrals with regard to such product(s) or service(s), which can represent a conversion ratio, for example. The amount of incentive can also be based on various other factors (e.g., incentive criteria), such as the number of successful referrals, the total number of referrals, the type of desired action performed, the type of referral (e.g., referral in a blog, referral in an e-mail, etc.), etc.

Determination of the incentive amount with regard to a user, and a product or service can be performed, for example, for a predetermined time period, or on a rolling basis, where an evaluation can be performed upon each successful referral by the user. Such determination can be performed by the evaluation component 106, for example.

The incentive that can be awarded can be in virtually any form, such as, for example, monetary, points, coupons, awards, products, services, and/or other compensation or remuneration. The incentive can be awarded to the user and deposited in the account of the user, for example.

In accordance with one aspect of the disclosed subject matter, the advertiser can pay a user a certain amount of incentive for each successful referral. The advertiser can also provide a bonus incentive (e.g., additional incentive) that can be determined as a function of the number of successful referrals and the total number of referrals made by the user with regard to the product(s) and/or service(s). In accordance with an aspect, the bonus incentive can increase as the percentage of successful referrals as compared to the total number of referrals increases; and, conversely, such incentive can decrease as the percentage of successful referrals as compared to the total number of referrals decreases. For example, the amount of incentive, including bonus incentive, can be determined as described with regard to, for example, methodology 500 and/or system 100.

Further, the referral data, and other data, can be evaluated by evaluation component 106 to determine the type of incentive. In accordance with one aspect of the disclosed subject matter, the same type of incentive can be awarded to a user regardless of the type of desired action performed by the recipient with regard to the referral made by the user.

In accordance with another aspect of the disclosed subject matter, a different type of incentive can be awarded to a user based on the desired action performed by the recipient with regard to the referral made by the user. For example, evaluation component 106 can determine that a purchase of a product made by a recipient with regard to a referral of the product by the user can result in an incentive that can include money being awarded to the user. Further, evaluation component 106 can determine that registration for a free trial sample of a product made by a recipient with regard to a referral of the product by the user can result in an incentive that can include reward points being awarded to the user.

In accordance with yet another aspect of the disclosed subject matter, the evaluation component 106 can determine the type of incentive that can be awarded a user based on whether the incentive is the primary incentive, such as can be awarded for each successful referral, or a secondary incentive, such as a bonus incentive that can be based on a conversion ratio associated with the user, product(s) and/or service (s), for example.

At 710, the incentive can be distributed, for example, into the account of the user via distribution component 108, for example. At this point, methodology 700 can end.

It should be appreciated that the methodologies disclosed herein and throughout this specification are capable of being stored on an article of manufacture to facilitate transporting and transferring such methodologies to computers. The term article of manufacture, as used herein, is intended to encompass a computer program accessible from any computer-readable device, carrier, or media.

It should also be appreciated that some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

Further, it has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 8:
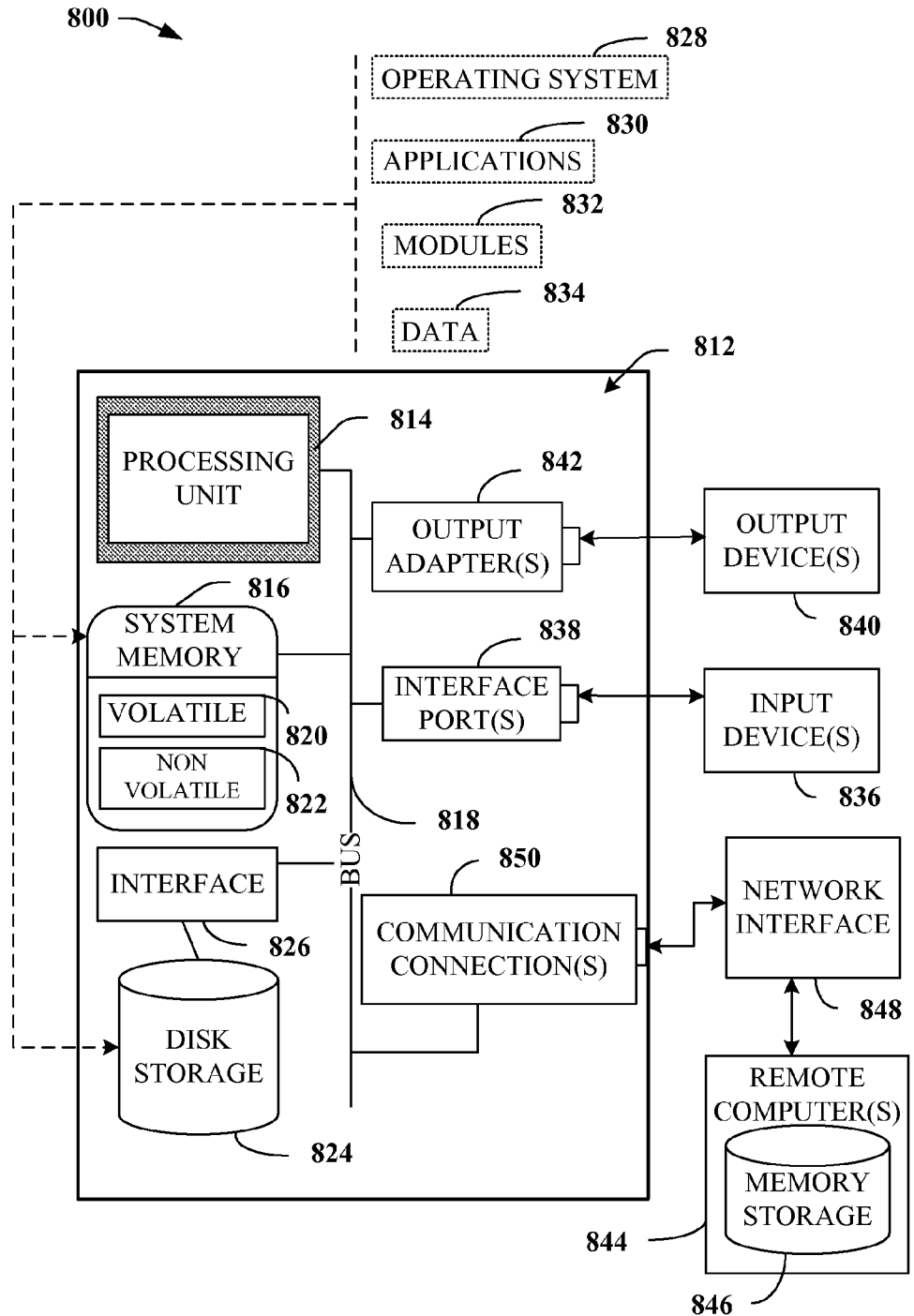
FIG. 8 is a schematic block diagram illustrating a suitable operating environment.
Figure 9:
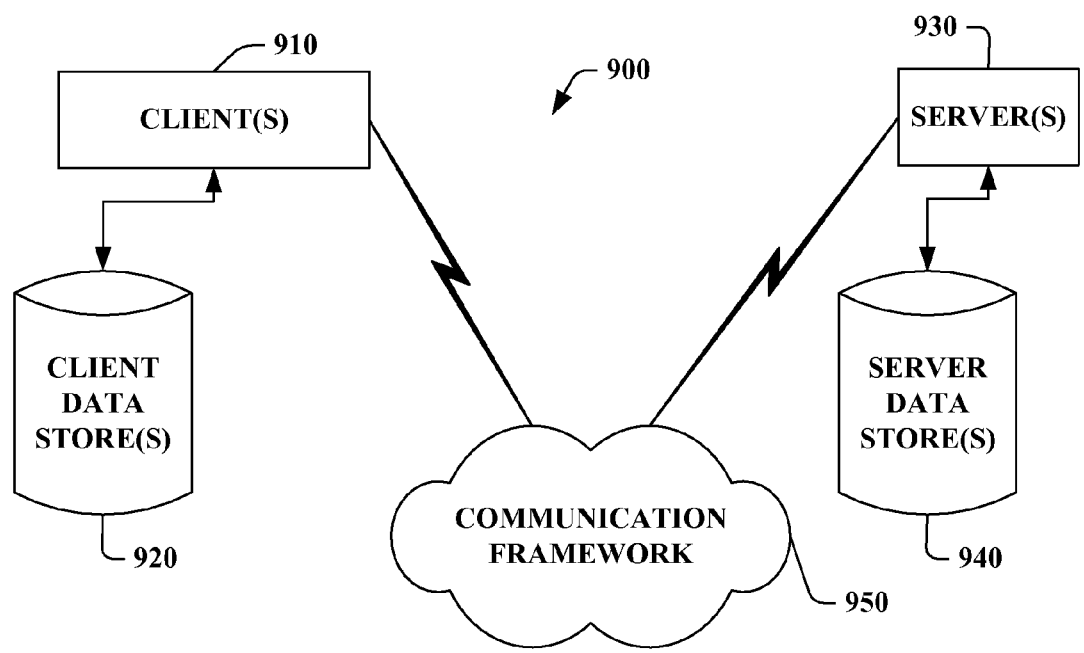
FIG. 9 is a schematic block diagram of a sample-computing environment.

In order to provide a context for the various aspects of the disclosed subject matter, FIGS. 8 and 9 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, handheld computing devices (e.g., personal digital assistant (PDA), phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 8, a suitable environment 800 for implementing various aspects of the claimed subject matter includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable programmable ROM (EEPROM), or flash memory. Volatile memory 820 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 812 also includes removable/non-removable, volatile/non-volatile computer storage media. FIG. 8 illustrates, for example, a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used, such as interface 826.

It is to be appreciated that FIG. 8 describes software that acts as an intermediary between users and the basic computer resources described in the suitable operating environment 800. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the claimed subject matter can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

FIG. 9 is a schematic block diagram of a sample-computing environment 900 with which the subject innovation can interact. The system 900 includes one or more client(s) 910. The client(s) 910 can be hardware and/or software (e.g., threads, processes, computing devices). The system 900 also includes one or more server(s) 930. Thus, system 900 can correspond to a two-tier client server model or a multi-tier model (e.g., client, middle tier server, data server), amongst other models. The server(s) 930 can also be hardware and/or software (e.g., threads, processes, computing devices). The servers 930 can house threads to perform transformations by employing the subject innovation, for example. One possible communication between a client 910 and a server 930 may be in the form of a data packet transmitted between two or more computer processes.

The system 900 includes a communication framework 950 that can be employed to facilitate communications between the client(s) 910 and the server(s) 930. The client(s) 910 are operatively connected to one or more client data store(s) 920 that can be employed to store information local to the client(s) 910. Similarly, the server(s) 930 are operatively connected to one or more server data store(s) 940 that can be employed to store information local to the servers 930.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system that facilitates determination of an incentive, comprising:

a central service component that receives information associated with at least one referral related to at least one of a product or service, or combination thereof, and determines at last one of an amount of incentive or a type of incentive, or a combination thereof, to distribute to at least one user based in part on a ratio of a number of successful referrals as compared to a total number of referrals, related to the at least one product or service, or a combination thereof, and associated with the at least one user, wherein the central service component operates to effect steps comprising:

storing, in a memory communicatively coupled to a microprocessor, computer-executable instructions for facilitating determination of the incentive;

executing the instructions on the microprocessor;

according to the instructions being executed;

using the microprocessor to distinguish between successful referrals, unsuccessful referrals and referrals which have not achieved success but have not expired, wherein referrals that have not expired are not used in calculations of the amount of the incentive, and wherein referrals are considered to have expired if they are not successful within a predetermined period of time;

calculating, using the microprocessor, the amount of the incentive based on a formula comprising $I=(c'SR1)+(d \times SR2)+(e \times 1/UR)$, wherein I is a total incentive paid, c is an incentive paid for a first type of successful referral, SR1 is a number of successful referrals of the first type, d is a payment made for a second type of successful referral, SR2 is a number of successful referrals of the second type; e is an incentive payment for referrals generally, and UR is a number of unsuccessful referrals happening in a period of time wherein successful referrals resulted;

wherein the first type of successful referrals SR1 involve product purchases, the second type of successful referrals SR2 involve customer trials, and wherein the total incentive I is calculated based in part on unsuccessful referral data UR that is based on historical data including a same product as the total incentive payment I is paid and products different from the same product as that for which the total incentive I is calculated;

wherein expiration of a referral is based on passage of the predetermined time, and wherein the predetermined time is measured from when an email message or SMS message is sent or when an advertisement on a website or blog is clicked; and wherein a different weight is applied to referrals made through a website or a blog than referrals made through emails or instant messages, and wherein the different weight results in different values of the values c and d.

2. The system of claim 1, further comprising an evaluation component that is associated with the central service component and receives information associated with the at least one referral, analyzes the received information, and compares the received information to a subset of incentive criteria.

3. The system of claim 2, the subset of incentive criteria is based on at least one of a type of referral, a conversion ratio, a total number of referrals, a number of successful referrals, a type of desired action, a time the at least one referral occurred, a time at least one successful referral occurred, or a combination thereof, related to the at least one of a product or service, or combination thereof.

4. The system of claim 3, wherein the evaluation component determines at least one of the type of incentive or the amount of incentive, or a combination thereof, based on the subset of incentive criteria.

5. The system of claim 1, the at least one of an amount of incentive or a type of incentive comprising a primary incentive based on one or more successful referrals and at least one other incentive based on a conversion ratio determined as a function of a number of successful referrals as compared to the total number of referrals made by the at least one user.

6. The system of claim 1, further comprising a distribution component that can facilitate distribution of the incentive to the at least one user, the type of incentive is comprised of at least one of money, points, coupons, awards, products, or services, or a combination thereof.

7. The system of claim 1, the central service component provides the at least one user with a predetermined number of referral opportunities, and provides the at least one user a predetermined number of additional referral opportunities based on each successful referral.

8. The system of claim 1, further comprising a data store that can store data associated with at least one referral related to at least one product or service, or a combination thereof, and associated with the at least one user.

9. The system of claim 1, the at least one referral is a successful referral when at least one desired action is performed by a recipient of the at least one referral, the at least one desired action comprising at least one of a purchase of a product or a service, a free trial of the product or the service, a download of software related to the product or the service, a registration for the product or the service, a completion of a form related to the product or the service, an appointment with regard to the product or service, or a review or comments related to the product or the service, or a syndication of an advertising package related to the product or the service, or a combination thereof.

10. The system of claim 1, further comprising a community network that is associated with the central service component, the community network provides information to the central service component.

11. The system of claim 1, further comprising an intelligent component that makes an inference as to the at least one of an amount, a type of incentive, or whether a referral is a successful referral, or a combination thereof.

12. The system of claim 1, the at least one referral is contained in at least one of a web site, a web page, a webfeed, a blog, an e-mail, an instant message, a short message service, a multimedia messaging service, an enhanced messaging service, or a combination thereof.

13. At least one computer that comprises the central service component of claim 1.

14. A method that facilitates determining an amount of incentive, comprising:
    storing, in a memory communicatively coupled to a microprocessor, computer-executable instructions for facilitating determination of the incentive;
    executing the instructions on the microprocessor;
    according to the instructions being executed:
    evaluating, using the microprocessor, a subset of information associated with at least one referral related to at least one of a product or service, or a combination thereof, and associated with at least one user; and
    using the microprocessor to determine the amount of incentive to award the at least one user based on a subset of incentive criteria comprising at least a ratio of a number of successful referrals compared to a total number of referrals associated with the at least one user, a successful referral is a referral that resulted in a recipient of the referral performing a desired action associated with the referral, wherein determining the amount of incentive to award comprises steps comprising:
    using the microprocessor to distinguish between successful referrals, unsuccessful referrals and referrals which have not achieved success but have not expired, wherein referrals that have not expired are not used in calculations of the amount of the incentive, and wherein referrals are considered to have expired if they are not successful within a predetermined period of time;
    calculating, using the microprocessor, the amount of the inventive based on a formula comprising $I=(c \times SR1)+(d \times SR2)+(e \times 1/UR)$, wherein I is a total incentive paid, c is an incentive paid for a first type of successful referral, SR1 is a number of successful referrals of the first type, d is a payment made for a second type of successful referral, SR2 is a number of successful referrals of the second type; e is an incentive payment for referrals generally, and UR is a number of unsuccessful referrals happening in a period of time wherein successful referrals resulted;
    wherein the first type of successful referrals SR1 involve product purchases, the second type of successful referrals SR2 involve customer trials, and wherein the total incentive I is calculated based in part on unsuccessful referral data UR that is based on historical data including a same product as the total incentive payment I is paid and products different from the same product as that for which the total incentive I is calculated;
    wherein expiration of a referral is based on passage of the predetermined time, and wherein the predetermined time is measured from when an email message or SMS message is sent or when an advertisement on a website or blog is clicked; and
    wherein a different weight is applied to referrals made through a website or a blog than referrals made through emails or instant messages, and wherein the different weight results in different values of c and d.

15. The method of claim 14, further comprising:
    comparing the number of successful referrals made by the at least one user with the total number of referrals made by the at least one user;
    distributing an incentive based on a subset of incentive criteria if the user has at least one successful referral.

16. The method of claim 14, further comprising:
    receiving information associated with at least one of a referral, a successful referral, an advertisement, a type of advertisement, a product, a service, an origination of a referral, a destination of a referral, a time a referral was made, a time a desired action is performed, meta data associated with a referral or an advertisement, user activity, or the at least one user, or a combination thereof, associated with the at least one user.

17. The method of claim 14, further comprising:
    receiving information associated with the subset of incentive criteria, the information associated with at least one of a user account, the at least one user, a product, a service, a conversion ratio, referrals, a total number of referrals, a total number of successful referrals, a type of referral, or a type of desired action, or a combination thereof; and
    determining at least one of a type of incentive or an amount of incentive, or a combination thereof, based in part on the subset of incentive criteria, the type of incentive is at least one of monetary, points, coupons, awards, products, or services, or a combination thereof.

18. The method of claim 14, further comprising:
    accessing a user account associated with the at least one user;

registering a referral made by the at least one user in the user account; and registering a successful referral made by the at least one user in the user account.

19. A system for determining an incentive, comprising:

means for analyzing data associated with at least one referral of at least one of a product or service, or a combination thereof; and means for determining at least one of an amount of the incentive or a type of the incentive, or a combination thereof, to be awarded to at least one user based on an incentive criteria comprising comparing a number of successful referrals to the total number of referrals, related to the at least one of a product or service, or a combination thereof, and associated with the at least one user, wherein the means for determining operates to effect steps comprising:

storing, in a memory communicatively coupled to a microprocessor, computer-executable instructions for determining the incentive;

executing the instructions on the microprocessor;

according to the instructions being executed;

using the microprocessor to distinguish between successful referrals, unsuccessful referrals and referrals which have not achieved success but have not expired, wherein referrals that have not expired are not used in calculations of the amount of the incentive, and wherein referrals are considered to have expired if they are not successful within a predetermined period of time;

calculating, using the microprocessor, the amount of the incentive based on a formula comprising $I=(c \times SR1)+(d \times SR2)+(e \times 1/UR)$, wherein I is a total incentive paid, c is an incentive paid for a first type of successful referral; SR1 is a number of successful referrals of the first type, d is a payment made for a second type of successful referral, SR2 is a number of successful referrals of the second type; e is an incentive payment for referrals generally, and UR is a number of unsuccessful referrals happening in a period of time wherein successful referrals resulted;

wherein the first type of successful referrals SR1 involve product purchases, the second type of successful referrals SR2 involve customer trials, and wherein the total incentive I is calculated based in part on unsuccessful referral data UR that is based on historical data including a same product as the total inventive payment I is paid and products different from the same product as that for which the total incentive I is calculated;

wherein expiration of a referral is based on passage of the predetermined time, and wherein the predetermined time is measured from when an email message or SMS message is sent or when an advertisement on a website or blog is clicked; and wherein a different weight is applied to referrals made through a website or a blog than referrals made through emails or instant messages, and wherein the different weight results in different values of the values c and d.

20. The system of claim 19, further comprising:

means for monitoring data associated with at least one referral related to the at least one of a product or service, or a combination thereof, and associated with the at least one user means for receiving the data;

means for storing the data;

means for comparing the data with a subset of incentive criteria means for determining an incentive to provide the at least one user based on the subset of incentive criteria; and means for providing the incentive to an account associated with the at least one user.

\* \* \* \* \*